United States Patent
Brown et al.

(10) Patent No.: US 11,780,161 B2
(45) Date of Patent: *Oct. 10, 2023

(54) ADDITIVE MANUFACTURING APPARATUS AND METHODS

(71) Applicant: RENISHAW PLC, shir (GB)

(72) Inventors: Ceri Brown, Redland (GB); Nicholas H H Jones, Stroud (GB); David G J Ewing, Stafford (GB); Geoffrey McFarland, Wickwar (GB)

(73) Assignee: RENISHAW PLC, Wotton-Under-Edge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,839

(22) Filed: Aug. 11, 2022

(65) Prior Publication Data
US 2022/0379552 A1 Dec. 1, 2022

Related U.S. Application Data

(63) Continuation of application No. 16/655,881, filed on Oct. 17, 2019, now Pat. No. 11,446,863, which is a
(Continued)

(30) Foreign Application Priority Data

Mar. 30, 2015 (GB) ..................................... 1505458

(51) Int. Cl.
*B33Y 50/02* (2015.01)
*B29C 64/393* (2017.01)
(Continued)

(52) U.S. Cl.
CPC ............ *B29C 64/153* (2017.08); *B22F 10/28* (2021.01); *B22F 10/366* (2021.01); *B22F 12/44* (2021.01);
(Continued)

(58) Field of Classification Search
CPC ........ B22F 10/28; B22F 10/366; B22F 12/44; B22F 12/49; B29C 64/153; B29C 64/264;
(Continued)

(56) References Cited

U.S. PATENT DOCUMENTS

| 4,863,538 A | 9/1989 | Deckard |
| 5,017,317 A | 5/1991 | Marcus |

(Continued)

FOREIGN PATENT DOCUMENTS

| CN | 1286654 A | 3/2001 |
| CN | 101960385 A | 1/2011 |

(Continued)

OTHER PUBLICATIONS

Bechtold et al. "Evaluation of disparate laser beam deflection technologies by means of number and rate of resolvable spots". Optics Letters, vol. 38, No. 16, p. 2934-2937, 2013.
(Continued)

*Primary Examiner* — Yuhui R Pan
(74) *Attorney, Agent, or Firm* — Oliff PLC

(57) ABSTRACT

An additive manufacturing apparatus including a scanner for directing a laser beam on to layers of flowable material to selectively solidify the material to form an object in a layer-by-layer manner. The scanner includes an optical component operable under the control of a first actuator to reflect the laser beam over a first range of angles in a first dimension and the or a further optical component operable under the control of a second actuator to reflect the laser beam over a second range of angles in the first dimension, wherein the second actuator provides a faster dynamic response but a smaller range of movement of the laser beam than the first actuator.

25 Claims, 10 Drawing Sheets

Related U.S. Application Data continuation of application No. 15/555,455, filed as application No. PCT/GB2016/050869 on Mar. 29, 2016, now Pat. No. 10,479,018.

(51) Int. Cl.

| | | |
|---|---|---|
| *B29C 64/153* | (2017.01) | |
| *B33Y 10/00* | (2015.01) | |
| *B33Y 30/00* | (2015.01) | |
| *G02B 26/10* | (2006.01) | |
| *B29C 64/264* | (2017.01) | |
| *B29C 64/268* | (2017.01) | |
| *B33Y 40/00* | (2020.01) | |
| *B22F 10/28* | (2021.01) | |
| *B22F 12/44* | (2021.01) | |
| *B22F 12/49* | (2021.01) | |
| *B22F 10/366* | (2021.01) | |
| *G02B 26/00* | (2006.01) | |

(52) U.S. Cl.
CPC .......... *B22F 12/49* (2021.01); *B29C 64/264* (2017.08); *B29C 64/268* (2017.08); *B29C 64/393* (2017.08); *B33Y 10/00* (2014.12); *B33Y 30/00* (2014.12); *B33Y 40/00* (2014.12); *B33Y 50/02* (2014.12); *G02B 26/00* (2013.01); *G02B 26/101* (2013.01)

(58) Field of Classification Search
CPC ..... B29C 64/268; B29C 64/393; B33Y 10/00; B33Y 30/00; B33Y 40/00; B33Y 50/02; G02B 26/00; G02B 26/101; Y02P 10/25
See application file for complete search history.

(56) References Cited

U.S. PATENT DOCUMENTS

| | | | |
|---|---|---|---|
| 5,089,185 A | 2/1992 | Hirano et al. | |
| 5,155,321 A | 10/1992 | Grube et al. | |
| 5,155,324 A | 10/1992 | Deckard et al. | |
| 5,247,180 A | 9/1993 | Mitcham et al. | |
| 5,304,329 A | 4/1994 | Dickens, Jr. et al. | |
| 5,316,580 A | 5/1994 | Deckard | |
| 5,342,919 A | 8/1994 | Dickens, Jr. et al. | |
| 5,352,405 A | 10/1994 | Beaman et al. | |
| 5,387,380 A | 2/1995 | Cima et al. | |
| 5,393,482 A | 2/1995 | Benda et al. | |
| 5,427,733 A | 6/1995 | Benda et al. | |
| 5,490,882 A | 2/1996 | Sachs et al. | |
| 5,527,877 A | 6/1996 | Dickens, Jr. et al. | |
| 5,534,104 A | 7/1996 | Langer et al. | |
| 5,536,467 A | 7/1996 | Reichle et al. | |
| 5,730,925 A | 3/1998 | Mattes et al. | |
| 5,753,171 A | 5/1998 | Serbin et al. | |
| 5,786,562 A | 7/1998 | Larson | |
| 5,846,370 A | 12/1998 | O'Connor | |
| 5,908,569 A | 6/1999 | Wilkening et al. | |
| 5,985,204 A | 11/1999 | Otsuka et al. | |
| 6,042,774 A | 3/2000 | Wilkening et al. | |
| 6,197,575 B1 | 3/2001 | Griffith et al. | |
| 6,203,861 B1 | 3/2001 | Kar et al. | |
| 6,215,093 B1 | 4/2001 | Meiners et al. | |
| 6,391,251 B1 | 5/2002 | Keicher et al. | |
| 6,534,740 B1 | 3/2003 | Meiners et al. | |
| 6,554,600 B1 | 4/2003 | Hofmann et al. | |
| 6,583,379 B1 | 6/2003 | Meiners et al. | |
| 6,621,039 B2 | 9/2003 | Wang et al. | |
| 6,683,780 B2 | 1/2004 | Thomas et al. | |
| 6,815,636 B2 | 11/2004 | Chung et al. | |
| 6,930,278 B1 | 8/2005 | Chung et al. | |
| 6,932,935 B1 | 8/2005 | Oberhofer et al. | |
| 6,989,115 B2 | 1/2006 | Russell et al. | |
| 7,047,098 B2 | 5/2006 | Lindemann et al. | |
| 7,202,684 B2 | 4/2007 | Fenk | |
| 7,204,684 B2 | 4/2007 | Ederer et al. | |
| 7,296,599 B2 | 11/2007 | Cox | |
| 7,357,629 B2 | 4/2008 | Weiskopf et al. | |
| 7,378,052 B2 | 5/2008 | Harryson | |
| 7,387,359 B2 | 6/2008 | Hernandez et al. | |
| 7,515,986 B2 | 4/2009 | Huskamp | |
| 7,550,518 B2 | 6/2009 | Bredt et al. | |
| 7,569,174 B2 | 8/2009 | Ruatta et al. | |
| 7,790,096 B2 | 9/2010 | Merot et al. | |
| 7,874,445 B2 | 1/2011 | Hochsmann et al. | |
| 7,976,302 B2 | 7/2011 | Halder et al. | |
| 8,137,609 B2 | 3/2012 | McAlea et al. | |
| 8,137,739 B2 | 3/2012 | Philippi et al. | |
| 8,172,562 B2 | 5/2012 | Mattes | |
| 8,282,377 B2 | 10/2012 | Higashi et al. | |
| 8,753,105 B2 | 6/2014 | Scott | |
| 9,114,478 B2 | 8/2015 | Scott et al. | |
| 9,272,446 B2 | 3/2016 | Grebe et al. | |
| 10,335,901 B2 | 7/2019 | Ferrar et al. | |
| 10,337,335 B2 | 7/2019 | Pavlov et al. | |
| 2002/0090313 A1 | 7/2002 | Wang et al. | |
| 2002/0105114 A1 | 8/2002 | Kubo et al. | |
| 2002/0152002 A1 | 10/2002 | Lindemann et al. | |
| 2003/0021497 A1* | 1/2003 | Kandori | G02B 26/101 348/E9.026 |
| 2003/0132208 A1* | 7/2003 | Cutler | B23K 26/389 219/121.72 |
| 2003/0206820 A1 | 11/2003 | Keicher et al. | |
| 2004/0004594 A1 | 1/2004 | Kato et al. | |
| 2004/0045941 A1 | 3/2004 | Herzog et al. | |
| 2004/0094728 A1 | 5/2004 | Herzog et al. | |
| 2004/0099996 A1 | 5/2004 | Herzog | |
| 2004/0200816 A1 | 10/2004 | Chung et al. | |
| 2005/0116391 A1 | 6/2005 | Lindemann et al. | |
| 2005/0142024 A1 | 6/2005 | Herzog | |
| 2005/0179772 A1 | 8/2005 | Ishikawa et al. | |
| 2005/0237590 A1 | 10/2005 | Van Saarloos | |
| 2005/0263933 A1 | 12/2005 | Welch et al. | |
| 2005/0263934 A1 | 12/2005 | Chung et al. | |
| 2006/0048706 A1 | 3/2006 | Cheong et al. | |
| 2006/0118532 A1 | 6/2006 | Chung et al. | |
| 2006/0141089 A1 | 6/2006 | Larsson et al. | |
| 2006/0215246 A1 | 9/2006 | Kerekes et al. | |
| 2006/0219315 A1 | 10/2006 | Cox | |
| 2006/0219671 A1 | 10/2006 | Merot et al. | |
| 2006/0249485 A1 | 11/2006 | Partanen et al. | |
| 2007/0001342 A1 | 1/2007 | Oberhofer et al. | |
| 2007/0037037 A1 | 2/2007 | Nguyen et al. | |
| 2007/0057412 A1 | 3/2007 | Weiskopf et al. | |
| 2007/0126157 A1 | 6/2007 | Bredt | |
| 2007/0176851 A1 | 8/2007 | Willey et al. | |
| 2008/0131540 A1 | 6/2008 | Perret et al. | |
| 2008/0190905 A1 | 8/2008 | Heinlein | |
| 2008/0241392 A1 | 10/2008 | Dimter et al. | |
| 2009/0017220 A1 | 1/2009 | Muller et al. | |
| 2009/0206065 A1 | 8/2009 | Kruth et al. | |
| 2009/0266803 A1 | 10/2009 | Perret et al. | |
| 2009/0291308 A1 | 11/2009 | Pfister et al. | |
| 2010/0043698 A1 | 2/2010 | Bolt | |
| 2010/0233012 A1 | 9/2010 | Higashi et al. | |
| 2011/0001950 A1* | 1/2011 | DeVoe | G03F 7/70525 355/67 |
| 2011/0061591 A1 | 3/2011 | Stecker | |
| 2011/0135840 A1 | 6/2011 | Doye et al. | |
| 2011/0285060 A1 | 11/2011 | Yamamoto et al. | |
| 2011/0291331 A1 | 12/2011 | Scott | |
| 2012/0126457 A1 | 5/2012 | Abe et al. | |
| 2012/0251378 A1 | 10/2012 | Abe et al. | |
| 2013/0112672 A1 | 5/2013 | Keremes et al. | |
| 2013/0270705 A1 | 10/2013 | Wang et al. | |
| 2013/0270750 A1 | 10/2013 | Green | |
| 2014/0154088 A1 | 6/2014 | Etter et al. | |
| 2014/0252687 A1 | 9/2014 | El-Dasher et al. | |
| 2014/0263209 A1 | 9/2014 | Burris et al. | |
| 2014/0271965 A1 | 9/2014 | Ferrar | |
| 2014/0348691 A1 | 11/2014 | Ljungblad et al. | |
| 2015/0158111 A1 | 6/2015 | Schwarze et al. | |
| 2015/0174827 A1 | 6/2015 | Schwarze et al. | |
| 2015/0210013 A1 | 7/2015 | Teulet | |

(56) References Cited

U.S. PATENT DOCUMENTS

| | | |
|---|---|---|
| 2015/0283761 A1 | 10/2015 | Maeda et al. |
| 2016/0136730 A1 | 5/2016 | McMurtry et al. |
| 2016/0363869 A1 | 12/2016 | Hou |
| 2017/0136578 A1 | 5/2017 | Yoshimura |
| 2017/0304894 A1 | 10/2017 | Buller |

FOREIGN PATENT DOCUMENTS

| | | |
|---|---|---|
| CN | 103317233 A | 9/2013 |
| CN | 103846437 A | 6/2014 |
| CN | 104001915 A | 8/2014 |
| CN | 104802400 A | 7/2015 |
| EP | 1 466 718 A2 | 10/2004 |
| EP | 1 705 616 A1 | 9/2006 |
| EP | 2 514 553 A2 | 10/2012 |
| JP | S532091 U | 1/1978 |
| JP | H03-120509 A | 5/1991 |
| JP | H5-124115 A | 5/1993 |
| JP | 2002-079393 A | 3/2002 |
| JP | 2009-183970 A | 8/2009 |
| JP | 2011-514556 A | 5/2011 |
| JP | 2013-169796 A | 9/2013 |
| JP | 2015-166178 A | 9/2015 |
| WO | 92/20505 A1 | 11/1992 |
| WO | 96/29634 A1 | 9/1996 |
| WO | 2009/108543 A2 | 9/2009 |
| WO | 2010/007396 A1 | 1/2010 |
| WO | 2010/026397 A1 | 3/2010 |
| WO | 2012-052525 A1 | 4/2012 |
| WO | 2014/176536 A1 | 10/2014 |
| WO | 2014/199149 A1 | 12/2014 |
| WO | 2015/040433 A2 | 3/2015 |
| WO | 2015/113408 A1 | 8/2015 |
| WO | 2015/151864 A1 | 10/2015 |

OTHER PUBLICATIONS

Bechtold et al. "Beam shaping and high-speed, cylinder-lens-free beam guiding using acousto-optical deflectors without additional compensation optics". Optics Express, vol. 21, No. 12, 2013.

SolidStateScan: Solid state laser beam scanner for ultra-high-speed scanning in cw laser applications, p. 1-28, 2015.

Römer et al. "Electro-optic and acousto-optic laser beam scanners". Physics Procedia, vol. 56, p. 29-39, 2014.

Pereira et al. "Contributions for the next generation of 3D metal printing machines". Proceedings SPIE, vol. 9353, p. 935318-1-935318-10, 2015.

Lu, Xiaodong. "Electromagnetically-Driven Ultra-Fast Tool Servos for Diamond Turning". Massachusetts Institute of Technology, p. 1-351, 2005.

Feb. 4, 2016 Search Report issued in United Kingdom Patent Application No. GB1505458.8.

Jun. 27, 2016 Written Opinion issued in International Patent Application No. PCT/GB2016/050869.

Sep. 28, 2018 Chinese Office Action issued in Chinese Patent Application No. 201680019343.X.

Long et. al. "Modeling and design of a normal stress electromagnetic actuator with linear characteristics for fast steering mirror" from "Optical Engineering 53(5), 054192 (May 2014)" (Year: 2014).

Jul. 18, 2022 Office Action issued in U.S. Appl. No. 16/409,911.

* cited by examiner

ADDITIVE MANUFACTURING APPARATUS AND METHODS

This application is a continuation of U.S. application Ser. No. 16/655,881 filed Oct. 17, 2019, which is a continuation of Ser. No. 15/555,455 filed Sep. 1, 2017 (now U.S. Pat. No. 10,479,018), which is a National stage of International Application No. PCT/GB2016/050869 filed Mar. 29, 2016, which claims the benefit of British Application No. 1505458.8 filed Mar. 30, 2015. The disclosures of the prior applications are hereby incorporated by reference herein in their entireties.

FIELD OF INVENTION

This invention concerns a scanner and method for directing an energy beam in an additive manufacturing apparatus, in which layers of material are solidified in a layer-by-layer manner to form an object. The invention has particular, but not exclusive application, to selective laser solidification apparatus, such as selective laser melting (SLM) and selective laser sintering (SLS) apparatus.

BACKGROUND

Selective laser melting (SLM) and selective laser sintering (SLS) apparatus produce objects through layer-by-layer solidification of a material, such as a metal powder material, using a high energy beam, such as a laser beam. A powder layer is formed across a powder bed in a build chamber by depositing a heap of powder adjacent to the powder bed and spreading the heap of powder with a wiper across (from one side to another side of) the powder bed to form the layer. A laser beam is then scanned across areas of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774. Layers can be formed through rotational motion of a wiper relative the build platform, as described in U.S. Pat. No. 8,172,562.

The strategy used for scanning a laser beam can affect the thermal loads generated during the build and accuracy of a resultant solidified line of material. Excessive, unrestrained thermal loads created during the build cause warping and/or curling of the part being built.

Typically, the laser beam is scanned across the powder along a scan path. An arrangement of the scan paths will be defined by a scan strategy.

U.S. Pat. No. 5,155,324 describes a scan strategy comprising scanning an outline (border) of a part cross-section followed by scanning an interior (core) of the part cross-section. Scanning a border of the part may improve the resolution, definition and smoothing of surfaces of the part.

U.S. Pat. No. 5,155,324 and US2008/0241392 A1 describe scanning an area in a plurality of parallel scan paths (hatches). (Referred to herein as a "meander scan"). The direction of the scan paths are rotated between layers to homogenise tensions generated during the build. US2008/0241392 A1 extends this concept to scanning in a series of parallel stripes, wherein each stripe consists of a plurality of parallel scan path (hatches) running perpendicular to a longitudinal direction of the stripe. (Referred to herein as a "stripe scan"). US2008/0241392 A1 also discloses the stripes covering partial regions (commonly squares) of the area to be solidified, wherein the hatches of adjacent partial regions are at 90 degrees to each other. (Referred to herein as a "checkerboard scan")

US2005/0142024 discloses a scan strategy for reducing thermal loads comprising successively irradiating individual areas of a layer, which are at a distance from one another that is greater than or at least equal to a mean diameter of the individual areas. Each individual area is irradiated in a series of parallel scan paths (hatches).

It is known to use a continuous mode of laser operation, in which the laser is maintained on whilst the mirrors move to direct the laser spot along the scan path, or a pulsed mode of laser operation, in which the laser is pulsed on and off as the mirrors direct the laser spot to different locations along the scan path.

A melt pool generated by the laser is dependent upon the properties of the material and the state (powder or solidified) and temperature of material surrounding the volume being melted. The mode of laser operation can affect the state and temperature of the neighbouring material. For example, scanning of the laser spot along a scan path in continuous mode forms a large melt pool that is dragged along just behind the laser spot, resulting in larger, less detailed solidification lines. For some materials, such as tool steels and aircraft grade super alloys, it can be difficult to drag the melt pool across the layer in a continuous mode of operation of the laser. These problems can be mitigated by using the laser beam in the pulsed mode of operation. In particular, setting the time between pulses/distance between exposure points to be long enough to allow a previously formed melt pool to cool before forming an adjacent melt pool can result in more accurate solidification lines, which may be particularly beneficial for border scans.

The laser beam is typically steered on to the powder bed using a pair of mirrors that can be tilted to a required angle by galvanometers. An example of such a scanner is described in WO2010/026397. The limited dynamic response of the galvanometers can result in significant divergence of the laser beam from the desired patterns (as described above). In particular, it has been found that, at the transition between hatch lines, the mirrors direct the laser beam in a curved path, visible in parts that are manufactured, rather than providing a sharp angular change in direction. For scanning of a laser in a pulsed mode, ideally the mirrors direct the laser beam at a fixed spot on the working surface when the laser is on, hopping to the next exposure point between pulses. However, the dynamic response of the galvanometers is too slow relative to desired point exposure times and time between exposures such that the mirrors will still be moving during an exposure. This results in the creation of elongate melt pools having melt characteristics similar to continuous scanning. Such problems can be overcome by increasing the time between exposures in order to give the mirrors time to move to and settle in the new position but this can significantly lengthen the build time.

"Electro-optic and acousto-optic laser beam scanners", G. R. B. E. Römer, P. Bechtold, Physics Procedia 56 (2014), 29-39, discloses combining a mirror based scanner with an electro or acoustic optical deflector, which relies on a change in refractive index n of the material to control deflection of a laser beam. A problem with the electro and acoustic optical deflectors is that the deflectors absorb a significant proportion of the light travelling therethrough. Accordingly, such deflectors are unsuitable for use with high power laser beams because of the resultant heating of the deflector that would occur. Such heating would make it extremely difficult, if not impossible, to control the temperature of the crystals of the deflector to be just above the Curie temperature, as required.

SUMMARY OF INVENTION

According to a first aspect of the invention there is provided a scanner for directing an energy beam in an additive manufacturing apparatus comprising a first beam steering component for deflecting the energy beam over a first range of angles in a first dimension and a second beam steering component for deflecting the energy beam over a second range of angles in the first dimension, wherein the second beam steering component provides a faster dynamic response but a smaller range of movement of the energy beam than the first beam steering component.

In this way, the scanner can deflect the energy beam over a large range of angles in the first dimension whilst achieving rapid changes in direction unachievable using the first beam steering component alone. The dynamic capability of the scanner may allow the energy beam to be scanned along paths closer to the ideal scanning strategies, such as those described above.

The scanner may comprise a controller arranged to control the first and second beam steering components to accelerate/decelerate the energy beam in the first dimension using the faster dynamic response of the second beam steering component synchronously with moving the energy beam in the first dimension using the first beam steering component.

The controller may be arranged to control the first and second beam steering components such that synchronously with operating the first beam steering component to deliver continuous motion in a direction, the second beam steering component is operated to deliver an oscillating motion such that the energy beam moves along a path in a series of a staccato movements. The resultant motion may be the energy beam performing a series of moves, wherein the energy beam is held relatively stationary to expose a region of the path to the energy beam (for example, when the action of the first beam steering component is to move the energy beam in an opposite direction in the first dimension to the action of the second beam steering component, with the possibility that the opposed actions cancel to provide a stationary energy spot) before the energy beam undergoes a short, sharp movement to "hop" the energy beam to another region of the path (for example, when the first and second beam steering components act to move the energy beam in the same direction in the first dimension). Such control of the beam steering components may be synchronised with a pulsed energy beam such that during the "hop" the energy beam is switched off. This may have particular application in additive manufacturing, wherein "hopping" the energy spot across the powder bed to expose a series of points may produce finer detail because of a reduction in or elimination of balling caused by dragging of the energy beam across the surface.

The controller may be arranged to control the first and second beam steering components such that synchronously with operating the first beam steering component to change a direction of the energy beam in the first dimension, the second beam steering component is operated to provide a sharper change in direction of the energy beam in the first dimension. In particular, the slower dynamic response of the first beam steering component may result in a longer stopping and accelerating distance in the first dimension than desired. The controller may be arranged to control the second beam steering component to compensate for divergence from a desired scanning path that would occur if an attempt was made to scan along the desired path only using the first beam steering component.

The energy beam may comprise a laser beam. The first beam steering component may comprise an optical component for reflecting the laser beam, the optical component operable under the control of a first actuator, and the second beam steering component may comprise the or a further optical component for reflecting the laser beam, the or the further optical component operable under the control of a second actuator. The second actuator may provide a faster dynamic response but a smaller range of movement of the laser beam than the first actuator. By reflecting the laser beam, significant absorption of the laser beam in the optical component can be avoided. The optical component may be arranged to absorb less than 1% of the radiant flux of the laser beam. The optical component may be a mirror or a Bragg grating reflector. Such a reflector may be suitable for use with high power laser beams, such as laser beams of greater than 50 W, and preferably greater than 100 W, used in certain additive manufacturing processes.

The second actuator may comprise a piezoelectric actuator. Piezoelectric actuators typically provide a fast dynamic response but a smaller range of movement than a galvanometer. Alternatively, the second actuator may be one or more voice coils. In a further embodiment, the second actuator comprises one or more normal-stress actuators and, in particular, one or more hard-linearized normal-stress actuators.

The first actuator may be a galvanometer. Galvanometers typically provide a slower dynamic response than piezoelectric motors but a greater range of movement.

The and/or the further optical component may comprise a tiltable optical component. Alternatively, the and/or the further optical component may be a deformable component that can be deformed by the actuator to reflect the laser beam over a range of angles.

The energy beam may comprise an electron beam. The first beam steering component may comprise a first electromagnetic coil and the second beam steering component may comprise a second electromagnetic coil, the second magnetic coil arranged to generate a smaller magnetic field for deflecting the electron beam through a smaller range of angles then the first electromagnet.

The second electromagnet has a smaller inductance allowing faster changes in the magnetic field (faster dynamic response) than the first electromagnet. However, the resultant smaller magnetic field deflects the electron beam through a smaller range of angles. The larger magnetic field generated by the first electromagnet enables the electron beam to be deflected through a larger range of angles in the first dimension.

The scanner may comprise a third beam steering component for deflecting the energy beam over a third range of angles in a second dimension orthogonal to the first dimension. In this way, the scanner can steer the energy beam over a 2-dimensional area. The scanner may comprise a fourth beam steering component for deflecting the energy beam over a fourth range of angles in the second dimension, wherein the fourth beam steering component provides a faster dynamic response but a smaller range of movement of the energy beam than the third beam steering component.

In the case of the energy beam being a laser beam, the third beam steering component may comprise the or an additional optical component for reflecting the laser beam, the or the additional optical component operable under the control of a third actuator. The fourth beam steering component may comprise the, the further or the additional optical component for reflecting the laser beam, the, the further or the additional optical component operable under the control of a fourth actuator to deflect the energy beam in the second dimension. Alternatively, the fourth beam steering component may comprise a further additional optical component operable under the control of a fourth actuator to reflect the laser beam in the second dimension.

In the case of the energy beam being an electron beam, the third beam steering component may comprise a third electromagnetic coil and the fourth beam steering component may comprise a fourth electromagnetic coil, the fourth magnetic coil arranged to generate a smaller magnetic field for deflecting the electron beam through a smaller range of angles in the second dimension then the third electromagnet.

In this way, the scanner has an increased dynamic response in both the first and second dimensions.

The controller may be arranged to control the combination of the third and fourth actuators in a like manner to the combination of the first and second actuators, as described above.

According to a second aspect of invention there is provided an additive manufacturing apparatus comprising a build chamber, a build platform lowerable in the build chamber such that layers of flowable material can be successively formed across the build platform, a radiation generator for generating an energy beam and a scanner for directing the energy beam onto each layer to selectively solidify the material, the scanner comprising a beam steering component operable for deflecting the energy beam over a first range of angles in a first dimension and a second beam steering component for deflecting the energy beam over a second range of angles in the first dimension, wherein the second beam steering component provides a faster dynamic response but a smaller range of movement than the first beam steering component.

According to a third aspect of the invention there is provided a method of scanning a laser beam comprising operating a scanner according to the first aspect of the invention to accelerate/decelerate the energy beam in the first dimension using the faster dynamic response of the second beam steering component synchronously with moving the energy beam in the first dimension using the first beam steering component.

The method may be used in scanning the laser beam across layers of material in a layer-by-layer additive manufacturing process, wherein successive layers of flowable material are formed across a build platform and the laser beam is scanned across selected areas of each layer to consolidate the material in the selected areas.

According to a fourth aspect of the invention there is provided a data carrier having instructions stored thereon, which, when executed by a controller of a scanner according to the first aspect of the invention, causes the controller to control the first and second actuators of the scanner to carry out the method of the third aspect of the invention.

The data carrier of the above aspects of the invention may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to a fifth aspect of the invention there is provided a method of manufacturing a part using a layer-by-layer additive manufacturing process, the method comprising depositing successive layers of flowable material across a build platform and operating a scanner according to the first aspect of the invention to scan an energy beam across selected areas of each layer to consolidate the material in the selected areas, wherein the energy beam is accelerated/decelerated in the first dimension using the faster dynamic response of the second beam steering component synchronously with moving the energy beam in the first dimension using the first beam steering component.

According to a sixth aspect of the invention there is provided a part manufactured in accordance with the method of the fifth aspect of the invention.

DESCRIPTION OF EMBODIMENTS

Figure 1:
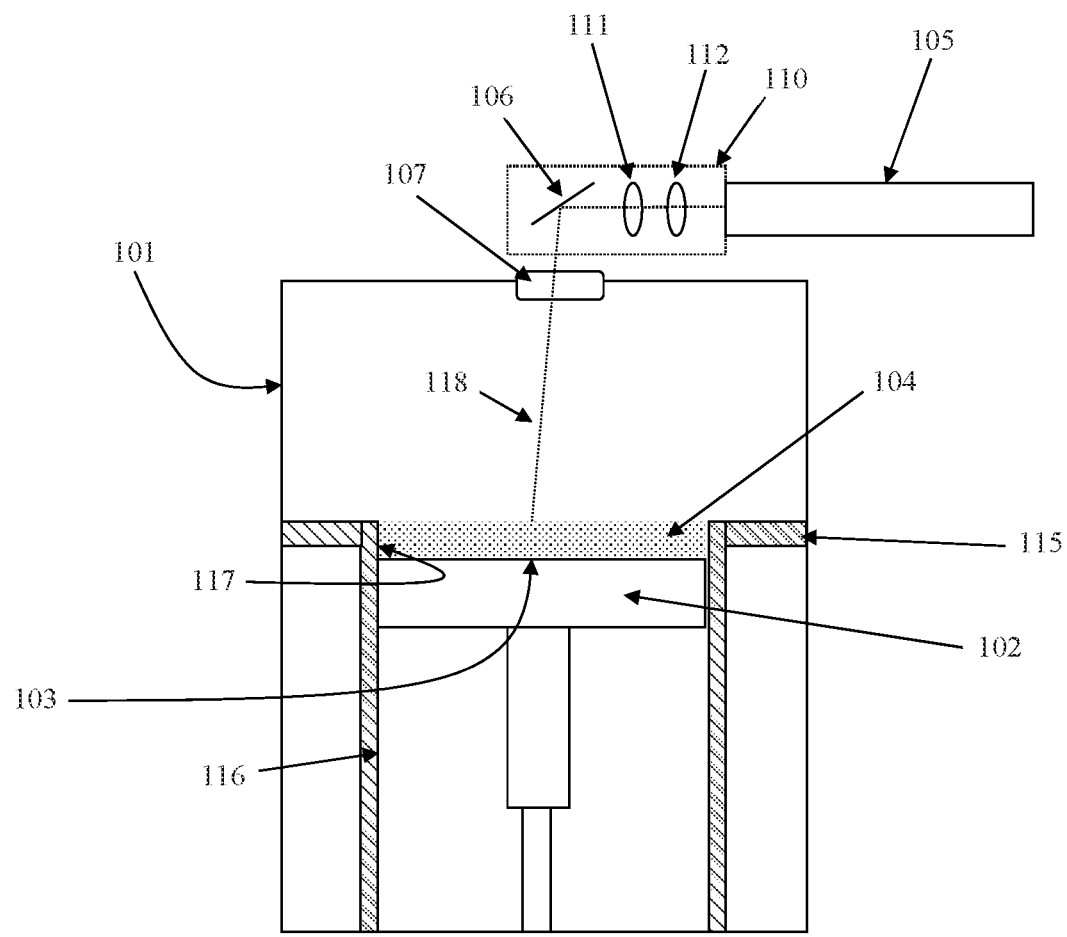
FIG. 1 is a schematic of a selective laser solidification apparatus according to an embodiment of the invention.
Figure 2:
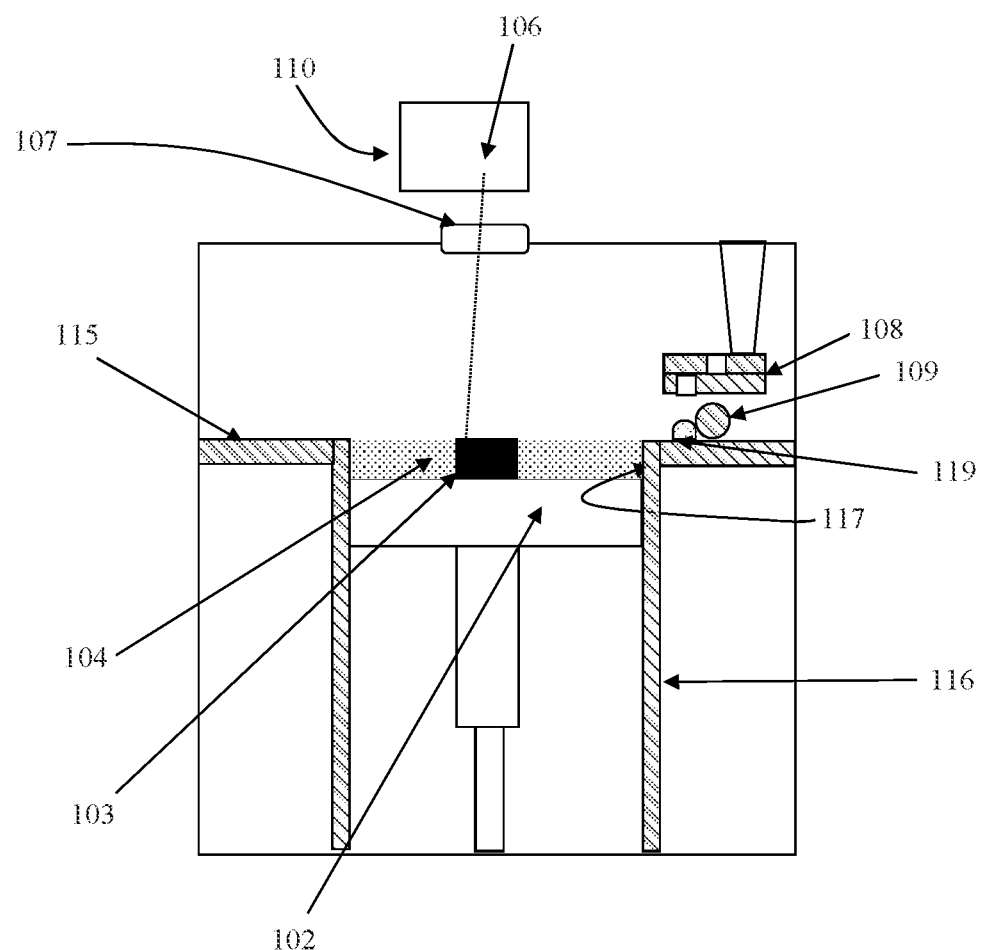
FIG. 2 is a schematic of the selective laser solidification apparatus from another side.

Referring to FIGS. 1 and 2, a laser solidification apparatus according to an embodiment of the invention comprises a main chamber 101 having therein partitions 115, 116 that define a build chamber 117 and a surface onto which powder can be deposited. A build platform 102 is provided for supporting an object 103 built by selective laser melting powder 104. The platform 102 can be lowered within the build chamber 117 as successive layers of the object 103 are formed. A build volume available is defined by the extent to which the build platform 102 can be lowered into the build chamber 117.

Layers of powder 104 are formed as the object 103 is built by dispensing apparatus 108 and an elongate wiper 109. For example, the dispensing apparatus 108 may be apparatus as described in WO2010/007396.

A laser module 105 generates a 500 W laser for melting the powder 104, the laser directed as required by a scanner, in this embodiment an optical module 110, under the control of a computer 130. The laser enters the chamber 101 via a window 107.

The optical module 110 comprises beam steering components 106 for directing the laser beam to the desired location on the powder bed 104 and focusing optics, in this embodiment a pair of movable lenses 111, 112, for adjusting a focal length of the laser beam. Actuators of the beam steering components 106 and focusing optics 111, 112 are controlled by a controller 139.

Figure 3A:
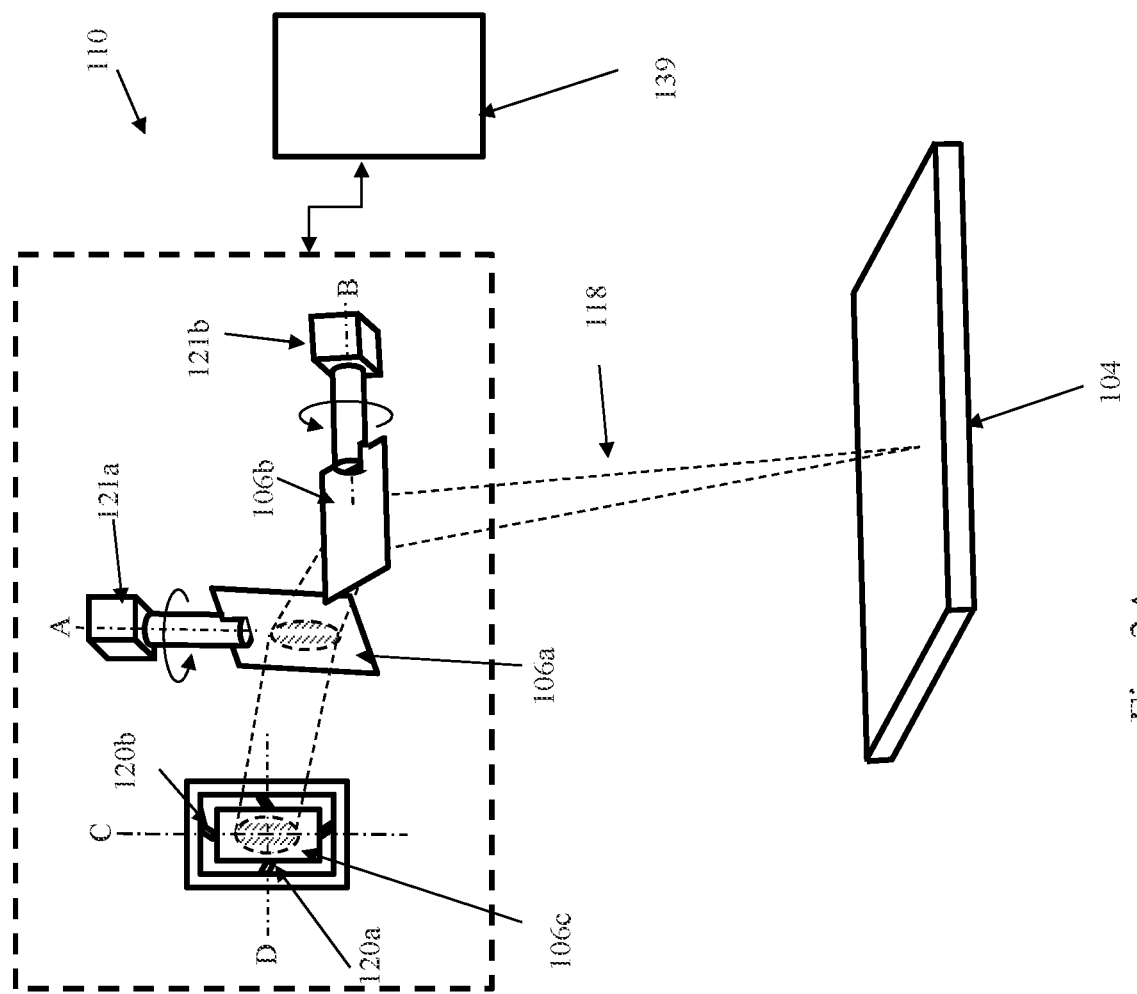
FIGS. 3A and 3B are schematic diagrams of a scanner according to one embodiment of the invention.
Figure 3B:
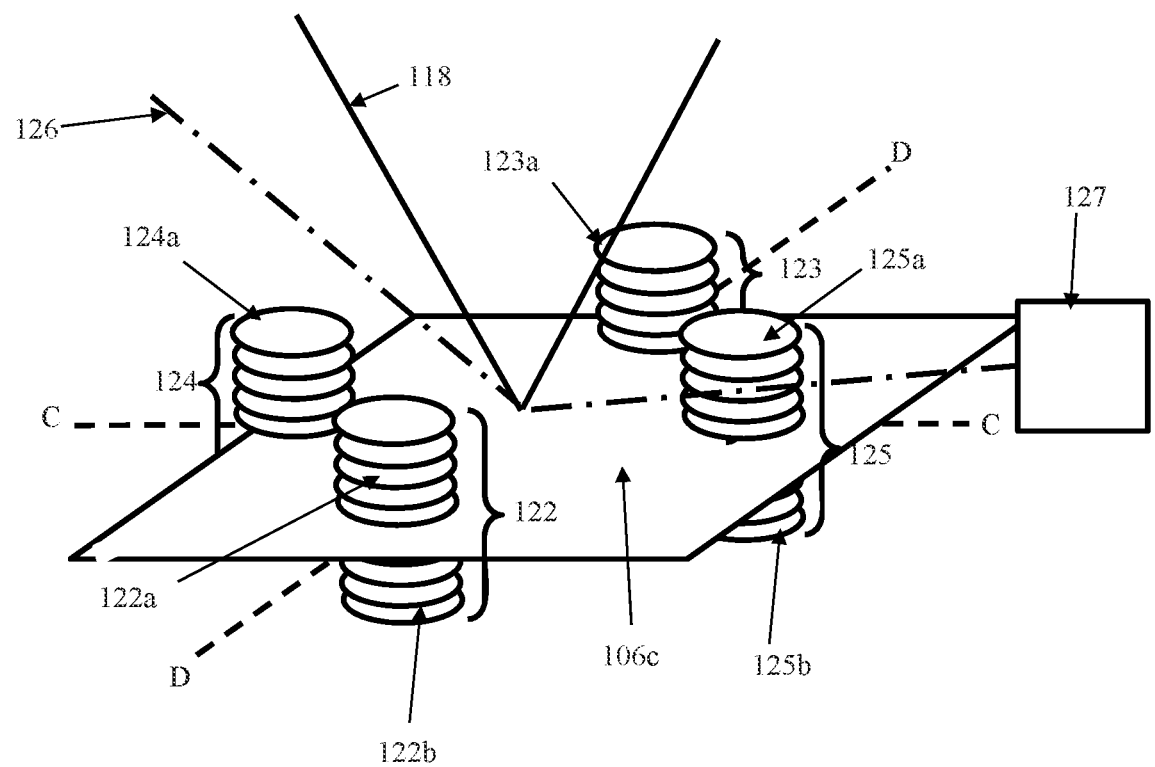

Referring to FIGS. 3A and 3B, in one embodiment, the beam steering components 106 comprise two movable mirrors 106a, 106b driven by galvanometers 121a, 121b and a third movable mirror 106c driven by a piezoelectric actuators 120a, 120b. Mirror 106a is rotatable about an axis A perpendicular to an axis B about which mirror 106b can be rotated, and the third movable mirror 106c is steerable about two perpendicular axes C, D. The mirrors 106a, 106b and 106c are arranged such that the laser passes through the focusing optics 111, 112 to mirror 106c, which deflects the laser on to mirror 106a. Mirror 106a deflects the laser onto mirror 106b and mirror 106b deflects the laser out of the optical module through a window or opening to the powder bed 104.

The piezoelectric actuator 120a is operable to rotate the mirror 106c by a few degrees in a direction about axis C and piezoelectric actuator 120b is operable to rotate the mirror 160c by a few degrees in a direction about an axis D. The piezoelectric actuators 120a, 120b provides a faster dynamic response (acceleration) than the galvanometers 121a, 121b but a smaller range of movement. The mirror 106c can be used to deflect the laser beam through a range of angles in the same dimensions as can be achieved with mirrors 106a and 106b. Typically, each galvanometer 121a, 121b will be capable of moving the associated mirror 106a, 106b through a range of angles about axis A, B of +/−10 degrees, although a range of angles of up to +/−20 degrees could be used. The piezoelectric actuators 120a, 120b will typically be capable of steering mirror 106c through a range of angles about axes C and D that is approximately 1% of the range of mirrors 106a, 106b.

FIG. 3B shows mirror 106c and the piezoelectric actuators 120a, 120b in more detail. Each piezoelectric actuator 120a, 120b comprises two pairs 122, 123; 124 125 of piezoelectric stacks 122a, 122b, 123a, 123b, 124a, 124b, 125a, 125b.

Each piezoelectric stack 122a, 122b, 123a, 123b, 124a, 124b, 125a, 125b comprises a stack of piezoelectric elements that are connected together to provide, as a combined structure, a sufficient range of movement of the mirror 106c. The piezoelectric stacks 122a, 122b, 123a, 123b, 124a, 124b, 125a, 125b may be held in place by supporting substrates (not shown), the supporting substrates applying a compressive force to the piezoelectric stacks 122a, 122b, 123a, 123b, 124a, 124b, 125a, 125b.

The two piezoelectric stacks 122a, 122b; 123a, 123b; 124a, 124b; 125a, 125b of each pair 122, 123, 124, 125 are located either side of the mirror 106c and aligned to apply a force to the same section of the mirror 106c. The stacks 122a, 122b; 123a, 123b; 124a, 124b; 125a, 125b of each pair 122, 123, 124, 125 work in tandem, with one of the piezoelectric stacks 122a, 123a, 124a, 125a operated to contract/extend when the other 122b, 123b, 124b, 125b is operated to perform the opposite motion (extend/contract). In this way, the piezoelectric stacks 122a, 122b; 123a, 123b; 124a, 124b; 125a, 125b of each pair 122, 123, 124, 125 apply a force to the mirror 106c in the same direction.

The two pairs 122, 123; 124, 125 of piezoelectric stacks of each actuator 120a; 120b are each attached to a periphery of the mirror 106a at a location spaced from the other pair 123, 122; 125, 124 either side of the corresponding axis C, D. The two pairs 122, 123; 124, 125 of piezoelectric stacks work in tandem to apply a force in opposite (linear) directions to cause rotation of the mirror 106c about the axis C, D.

Appropriate circuitry is connected to the piezoelectric stacks 122a, 122b, 123a, 123b, 124a, 124b, 125a, 125b to apply appropriate voltages to the stacks to control extension and contraction of the stacks.

A low powered laser may generate a monitoring laser beam 126 directed towards the mirror 106c and a sensor 127 is provided for detecting an angle at which the laser beam 126 is reflected from the mirror 106c. The sensed position of the laser beam 126 may be used as feedback to determine an angle of the mirror 106c about axes C and D.

Figure 4A:
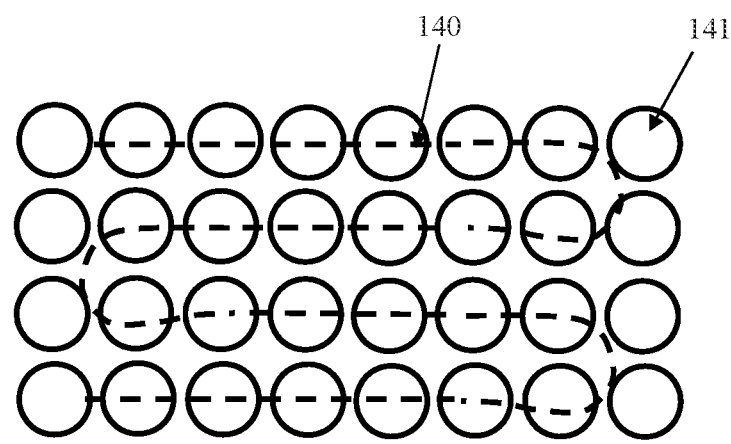
FIG. 4A is a diagram illustrating the scanning sequence of a laser beam according to an embodiment of the invention.

The actuators, 120a, 120b, 121a and 121b are controlled by controller 139 of the optical module 106, in manner as now described with reference to FIGS. 4A to 4C. Typically, the laser beam 118 is scanned across an area to be solidified in a series of hatch lines. For example, the laser beam 118 may be scanned across an area using a stripe, checkerboard or meander scan strategy. The mirrors 106a and 106b are controlled to move smoothly such that the mirrors 106a, 106b would direct the laser beam 118 along a path 140 if no additional steering of the laser beam 118 was provided by mirror 106c. Rapid changes in velocity and direction of rotation of the mirrors 106a to 106b are avoided. The piezoelectric actuators 120a, 120b are controlled by controller 139 to add perturbations to the path 140 that result in the laser beam 118 being "hopped" between static exposure points 141. In particular, the piezoelectric actuators 120a, 120b are controlled to maintain the laser beam spot substantially stationary for a set period of time (exposure time) at a point 141 on the powder bed 104 counteracting the continuous movement of the mirrors 106a, 106b. At the end of the exposure time, the piezoelectric actuators 120a, 120b move the mirror 106c rapidly to direct the laser beam 118 to the next point 141 along the hatch. In this way, the mirrors 106a and 106b provide the large scale movement of the laser beam 118 across the powder bed 104 and the mirror 106c oscillates to impart a small scale perturbation to the large scale movement.

At the end of the path 140 at least one of the mirrors 106a, 106b will have to undergo a change in direction to direct the laser beam 118 along the next hatch. Because of the relatively low dynamic response of the galvanometers 121a, 121b, it may not be possible for path 140 to follow the more sudden change is direction required by the points 141 at the ends of each hatch. However, the controller 139 may control the piezoelectric actuators 120a, 120b such that mirror 106c compensates for the slow change in direction provided by the mirrors 106a, 106b to move the laser beam spot between the points 141 at the end of the hatches with the required exposure time. Compensation may still be applied even when scanning in a continuous mode of operation (rather than the point scanning mode shown in FIG. 4A) in order that the laser beam 118 scans a path with a sharper change in direction than that which can be achieved with the mirrors 106a, 106b alone.

Figure 4B:
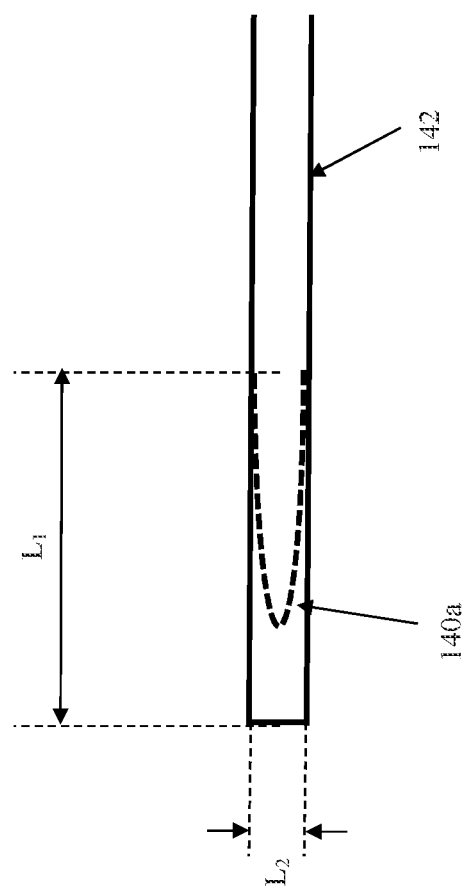
FIG. 4B shows the scan path of the galvanometer driven mirrors compared to a path followed by the laser spot resulting from the additional motion imparted on the laser beam by the piezoelectric driven mirror.

FIG. 4B shows a loop 140a of path 140 traced by the galvanometers when changing direction between hatch lines and a path 142, along which points (not shown) are scanned. The length of the loop 140a and the length $2L_1$ are selected such that the time it takes the galvanometers to trace path 140a is equivalent to the time it takes the galvanometers to trace a linear path of length $2L_1$ (The laser beam is typically "hopped" in a single jump across length $L_2$ such that the length of this section can be ignored. However, if $L_2$ is to be scanned in the same manner as lengths $L_1$, then the length of loop 140a and $2L_1+L_2$ are selected such that the time it takes the galvanometers to trace path 140a is equivalent to the time it takes the galvanometers to trace a linear path of length $2L_1+L_2$). As at least one of galvanometers slows in order to change direction along path 140a, path 140a will be shorter than the length $2L_1$. In this way the point exposure time and time between point exposures for the end of the hatches can be maintained consistent with the same for the middle of the hatches.

Figure 4C:
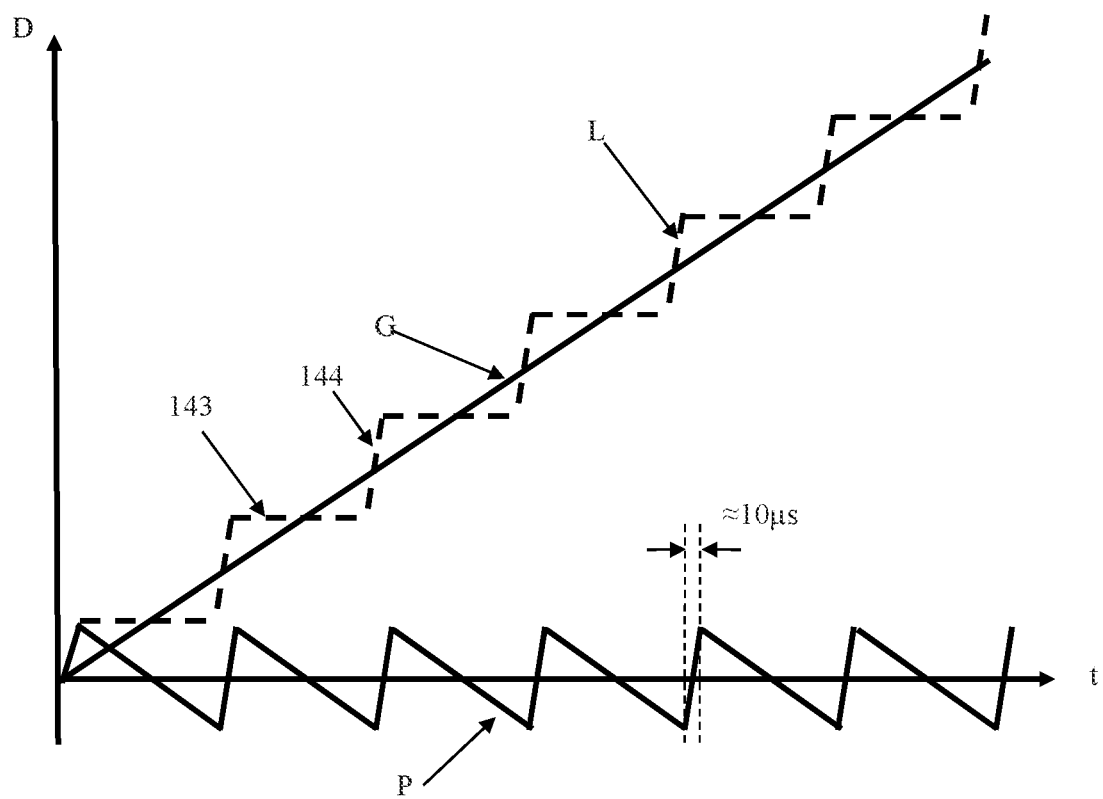
FIG. 4C is a graph showing a typical displacement of the laser spot on the powder bed during the scanning sequence.

FIG. 4C shows a graph of displacement, D, with time, t. To scan a middle portion of a hatch, mirrors 106a and 106b are moved such that the laser spot would be displaced on the powder bed 104 at a constant velocity, as shown by line G, if mirror 106c was kept static. Mirror 106c is moved such that the laser spot would be displaced on the powder bed 104 in accordance with the saw-tooth profile, shown by line P, if mirrors 106a and 106b were kept static. Line L indicates the actual displacement of the laser spot on the powder bed 104 as a result of the synchronous movement of the mirrors 106a, 106b and 106c. The negative gradient of the saw-tooth profile has the same magnitude as the positive gradient of line G. Accordingly, during this time period 142, the actions of the mirrors 106a, 106b and 106c on movement of the laser spot on the powder bed 104 cancel such that the laser spot is maintained stationary to expose a point 141 to the laser beam. When, during period 143, the movement of mirror 106c is to displace the laser beam in the same direction as the movement of mirrors 106a, 106b, the laser spot is "hopped" to the next point location on the powder bed 104. During period 143, the laser/laser beam may be switched off such that the laser spot is not scanned across the powder bed. In this way, a series of discrete points 141 are exposed to the laser beam.

These methods of providing a faster dynamic change in direction than that which can be achieved using the mirrors 106a, 106b alone may also be applied to other types of scans other than hatches, such as border scans.

Mirror 106c may also be used to compensate for settling time of the galvanometers. For example, when there is a gap between scan lines and/or areas to be scanned, the galvanometers may be moved quickly to redirect the laser beam 118 to the start of the subsequent scan line. For example, this may occur when moving from the last hatch line in a square of a checkerboard pattern or a stripe to the first hatch line of a subsequent square or stripe or between border scan lines. A further example is when forming a fine lattice structure that involves a series of single exposures or very small scan lines interposed with a gap. In such scenarios, the galvanometers can "wobble" at the start point of the scan line/at the exposure point after the galvanometers are operated to traverse the gap. It is known to provide a settling time to allow mirrors in a scanner to settle to a desired position after a deceleration.

With the scanner of the invention, mirror 106c can be used to compensate for undesired movement of the galvanometers that can occur during a deceleration. In this way, the settling time can be eliminated or at least reduced. This may be particular advantageous in the scanning of geometries having many gaps, as the elimination/reduction in settling time can significantly reduce the duration of the build. The galvanometers may comprise encoders for providing a measurement of the angle of the galvanometer. The piezoelectric mirror 106c may be controlled by controller 139 in response to the readings from the encoder to compensate for undesired movement of the mirrors 106a, 106b.

Figure 5:
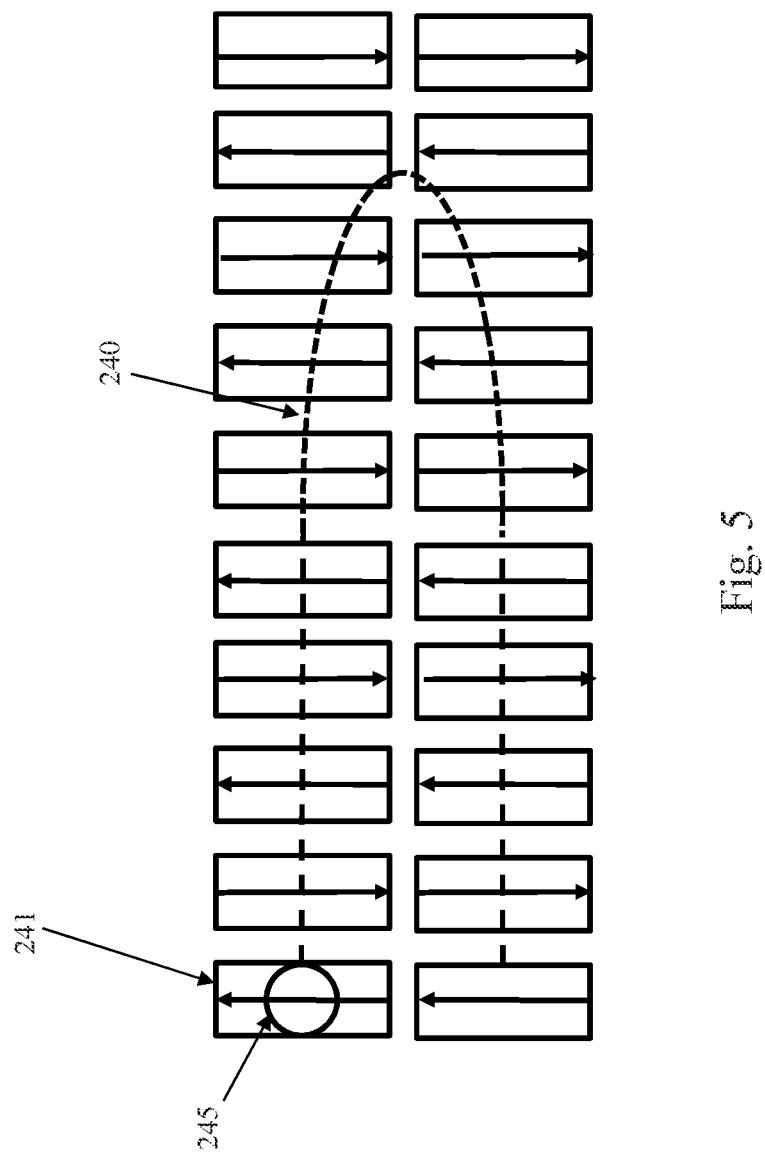
FIG. 5 shows a scanning strategy according to a further embodiment of the invention.

Rather than exposing the areas to be solidified as a series of point exposures 141 with a static laser spot, the areas may be exposed to a moving laser spot that is moved at least in a direction perpendicular to a hatch/scan line direction using the faster dynamic response of the mirror 106c. The exposed region could be a line or a spot larger than the laser spot. An example of such an embodiment is shown in FIG. 5. In this embodiment, for each exposure region 241 of a hatch line, the mirror 106c moves the laser spot 245 perpendicular to the hatch line (as indicated by the arrow) to expose a substantially line shaped region 241 to the laser spot 245. The laser spot 245 is then hopped to the next exposure region 241 in the hatch (in the manner as described above with reference to FIGS. 4A to 4C) to expose a further line shaped region 241 to the laser spot 245, for example, by scanning the laser spot 245 perpendicular to the hatch direction in the opposite direction to the previous line shaped region 241. Such a scanning strategy may allow higher power lasers to be used as the energy of the laser spot can be spread over a larger area within a set time period than when using the galvanometers alone to direct the laser spot.

Figure 6A:
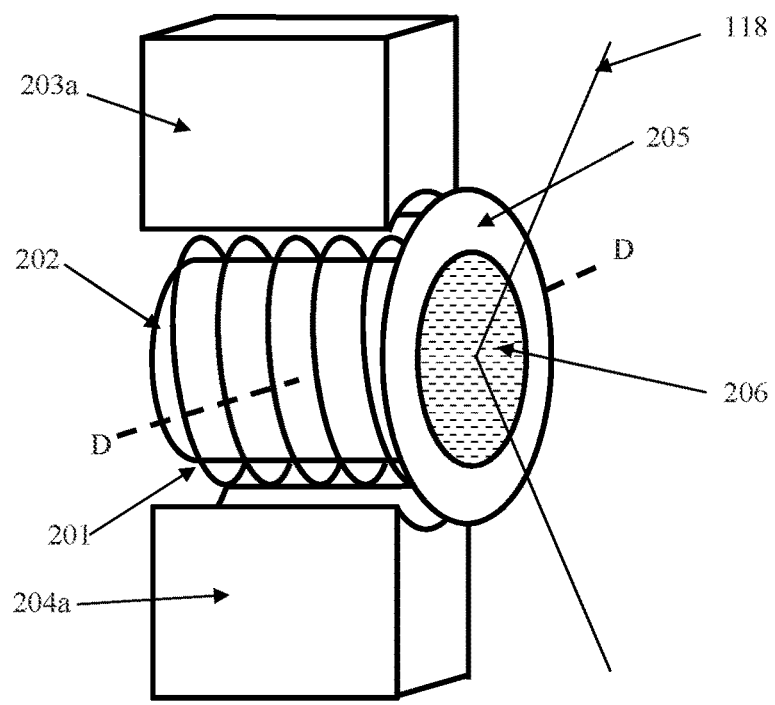
FIG. 6A is a perspective view of a steerable mirror and associated actuator according to a further embodiment of the invention.
Figure 6B:
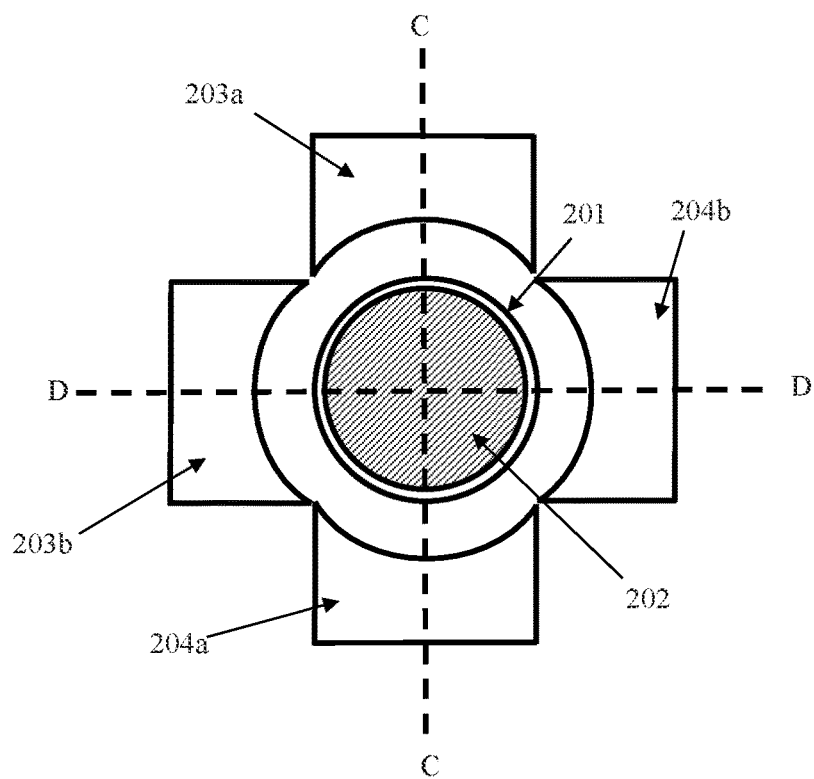
FIG. 6B is a cross-sectional view of the steerable mirror and associated actuator shown in FIG. 6A.

FIGS. 6A and 6B show a voice coil actuator and mirror arrangement 200 for providing a steering capability with a faster dynamic response than the galvanometers. Such an arrangement 200 may be used in place of the piezoelectric actuator. The arrangement 200 comprises a coil of wire 201 wound round an iron core 202. A mirror 206 for steering the laser beam 118 is mounted to the iron core 202. Four horse-shoe shaped electromagnets 203a, 204a; 203b, 204b (only two of which are shown in FIG. 6A) are circumferentially mounted around the centrally located iron core 202. The mirror 206 is biased to a central position by a planar spring 205. The planar spring 205 may be an "Isle of Man" spring, an example of which is described in U.S. Pat. No. 6,683,780, having three legs circumferentially and radially extending around the circular mirror 206.

In use, a substantially constant current is passed through coil 201 and the processor 141 controls each pair of electromagnets 203a, 204a; 203b, 204b to apply a magnetic field across the coil of wire 201 and iron core 202 to cause the iron core to pivot about axes C and D as required. Pivoting of the iron core 202 causes the mirror 206 to tilt against the biasing of the planar spring 205. The direction of the applied magnet field generated by each pair of electromagnets 203a, 204a; 203b, 204b can be used to control the direction in which the iron core pivots about the axes C and D.

The arrangement shown in FIGS. 6A and 6B can be controlled to carry out the scan strategies described with reference to FIGS. 4A to 4C.

A larger version of the actuator shown in FIGS. 6A and 6B could be used as a replacement for the galvanometers.

Figure 7:
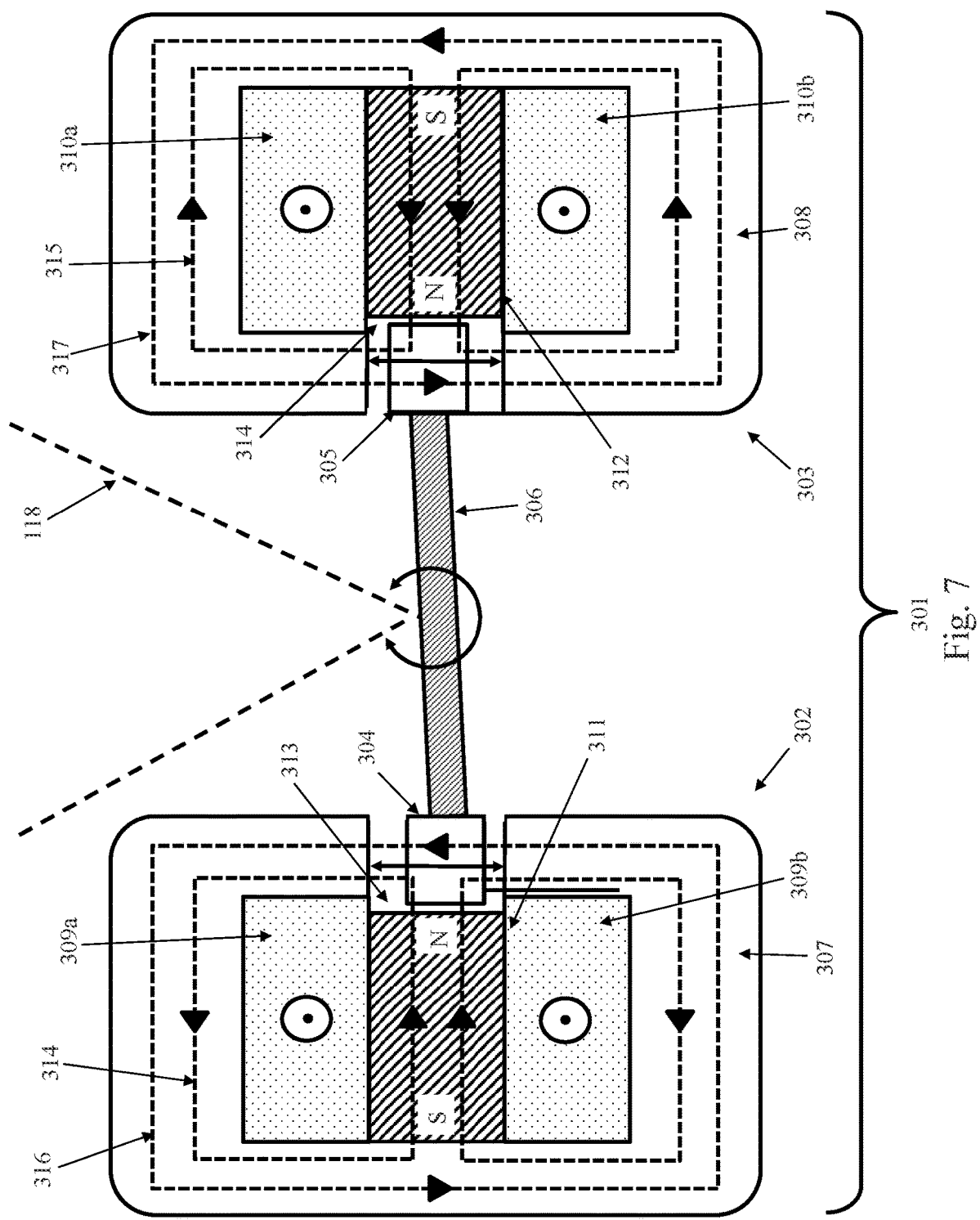
FIG. 7 is a perspective view of a steerable mirror and associated actuator according to a further embodiment of the invention.

FIG. 7 shows a further mirror arrangement 300 for providing a steering capability with a faster dynamic response than the galvanometers. Movement of the mirror 306 is controlled by a first actuator 301 for rotating the mirror 306 about one axis and a second actuator (not shown) to rotate the mirror 306 about a perpendicular axis. Each actuator 301 comprises a pair of hard-linearized normal-stress actuators 302, 303 that can linearly displace armatures 304, 305 attached to opposite edges of mirror 306. Displacement of the armatures 304, 305 in opposite directions rotates the mirror 306.

Each hard linearized actuator 303, 304 comprises a stator core 307, 308 made of soft magnetic material, coil windings 309a, 309b, 310a, 310b, permanent magnet 311, 312 and the armature 304, 305. The armature 304, 305 may be movable on a pad 313, 314, such as a rubber pad, to allow the shear motion of the armature 304, 305 relative to the permanent magnet 311, 312. Dotted line 315, 316 shows the biasing flux generated by the permanent magnet and line 317, 318 the AC flux controllable through control of the current flowing through the coil windings 309a, 309b, 310a, 310b.

The current passed through the coil windings 309a, 309b, 310a, 310b can be controlled to generate differential flux on each side of the armature 304, 305 to produce a net actuating force on the armature 304, 305. The actuating force is proportional to the current.

Normal stress actuators potentially have higher force density and thus higher acceleration (dynamic response) than shear stress actuators.

A more detailed discussion of ultra-fast hard-linearized normal-stress actuators can be found in the thesis "Electromagnetically-Driven Ultra-Fast Tool Servos for Diamond Turning", Xiaodong Lu, Massachusetts Institute of Technology, September 2005.

It will be understood that alterations and modifications may be made to the above described embodiments without departing from the scope of the invention as defined herein.

Rather than a single mirror 106c, 203, 306 actuated to rotate about two perpendicular axes, separate mirrors may be provided, one for each axis, each mirror steered by an actuator that has a faster dynamic response compared to the galvanometers.

The mirror 106c, 203. 306 may reflect the laser wavelength but transmit other wavelengths, for example, wavelengths that could be used to monitor the build process as described in International patent application PCT/GB2014/052887.

The piezoelectric actuator and galvanometer may be combined to control a common mirror such that the mirror can undergo movements through a large range of angles under the control of the galvanometer and sharper, more dynamic movements under the control of the piezoelectric actuator.

The invention claimed is:

1. A selective laser melting or selective laser sintering additive manufacturing apparatus comprising:—
    a scanner for directing a laser beam on to layers of powder of powder bed to selectively melt or sinter the powder to form an object in a layer-by-layer manner, the scanner comprising an optical component operable under the control of a first actuator to steer the laser beam over the powder bed in a first dimension in order to scan an area to be solidified and the or a further optical component operable under the control of a second actuator to steer the laser beam over the powder bed in the first dimension in order to scan an area to be solidified, wherein the second actuator provides a faster dynamic response but a smaller range of movement of the laser beam than the first actuator;
    and a controller configured to control the scanner such that the first actuator provides a large-scale movement of the laser beam across the powder bed and the second actuator oscillates to impart a small-scale perturbation to the large-scale movement.

2. A selective laser melting or selective laser sintering additive manufacturing apparatus according to claim 1, wherein the controller is configured to control the scanner such that, at least for a portion of a scan path, the first actuator would displace the laser beam at a constant velocity across the powder bed if not for the oscillations imparted by the second actuator.

3. A selective laser melting or selective laser sintering additive manufacturing apparatus according to claim 1, wherein the controller is configured to control the second actuator using a set oscillation profile of displacement of the laser beam in the first dimension with time.

4. A selective laser melting or selective laser sintering additive manufacturing apparatus according to claim 3, wherein the set oscillation profile is a saw-tooth profile.

5. A selective laser melting or selective laser sintering additive manufacturing apparatus according to claim 1, wherein the or the further optical component is operable under the control of the second actuator to steer the laser beam over the powder bed in a second dimension, transverse to the first dimension, in order to scan an area to be solidified.

6. A selective laser melting or selective laser sintering additive manufacturing apparatus according to claim 5, wherein the controller is configured to control the second actuator to oscillate the laser beam across the powder bed in the second dimension in concert with the first actuator moving the laser beam across the powder bed in the first dimension.

7. A selective laser melting or selective laser sintering additive manufacturing apparatus according to claim 6, wherein the oscillation of the laser beam across the powder bed in the second dimension generates an exposed region wider than the laser spot on the powder bed.

8. A selective laser melting or selective laser sintering additive manufacturing apparatus according to claim 1, wherein an additional optical component is operable under the control of a third actuator to steer the laser beam over the powder bed in a second dimension, transverse to the first dimension, in order to scan an area to be solidified.

9. A selective laser melting or selective laser sintering additive manufacturing apparatus according to claim 8, wherein the controller is configured to control the third actuator to oscillate the laser beam across the powder bed in the second dimension in concert with the first actuator moving the laser beam across the powder bed in the first dimension.

10. A selective laser melting or selective laser sintering additive manufacturing apparatus according to claim 9, wherein the oscillation of the laser beam across the powder bed in the second dimension generates an exposed region wider than the laser spot on the powder bed.

11. A selective laser melting or selective laser sintering additive manufacturing apparatus according to claim 1, wherein the first actuator is a galvanometer and the second actuator is a piezoelectric, voice coil or normal stress actuator.

12. A selective laser melting or selective laser sintering additive manufacturing apparatus according to claim 8, wherein the third actuator is a piezoelectric, voice coil or normal stress actuator.

13. A selective laser melting or selective laser sintering additive manufacturing apparatus according to claim 1, wherein the or the further optical component operable under the control of the second actuator is a tiltable mirror.

14. A selective laser melting or selective laser sintering additive manufacturing apparatus according to claim 1, wherein the additional optical component operable under the control of the third actuator is a tiltable mirror.

15. A selective laser melting or selective laser sintering additive manufacturing apparatus comprising:—
    a scanner for directing a laser beam on to layers of powder of powder bed to selectively melt or sinter the powder to form an object in a layer-by-layer manner, the scanner comprising an optical component operable under the control of a first actuator to steer the laser beam over the powder bed in a first dimension in order to scan an area to be solidified and the or a further optical component operable under the control of a second actuator to steer the laser beam over the powder bed in the first dimension in order to scan an area to be solidified, wherein the second actuator provides a faster dynamic response but a smaller range of movement of the laser beam than the first actuator;

and a controller configured to control the scanner such that synchronously with operating the first actuator to deliver continuous motion in the first dimension, the second actuator is operated to deliver an oscillating motion in the first dimension, wherein both the continuous motion delivered by the first actuator and the oscillating motion delivered by the second actuator cause movement of the laser beam across the powder bed in the first dimension.

16. A selective laser melting or selective laser sintering additive manufacturing apparatus according to claim 15, wherein the controller is configured to control the scanner such that, at least for a portion of a scan path, the first actuator would displace the laser beam at a constant velocity across the powder bed if not for the oscillating motion imparted by the second actuator.

17. A selective laser melting or selective laser sintering additive manufacturing apparatus according to claim 15, wherein the controller is configured to control the second actuator using a set oscillation profile of displacement of the laser beam in the first dimension with time.

18. A selective laser melting or selective laser sintering additive manufacturing apparatus according to claim 17, wherein the set oscillation profile is a saw-tooth profile.

19. A selective laser melting or selective laser sintering additive manufacturing apparatus according to claim 15, wherein the or the further optical component is operable under the control of the second actuator to steer the laser beam over the powder bed in a second dimension, transverse to the first dimension, in order to scan an area to be solidified.

20. A selective laser melting or selective laser sintering additive manufacturing apparatus according to claim 19, wherein the controller is configured to control the second actuator to oscillate the laser beam across the powder bed in the second dimension in concert with the first actuator moving the laser beam across the powder bed in the first dimension.

21. A selective laser melting or selective laser sintering additive manufacturing apparatus according to claim 20, wherein the oscillation of the laser beam across the powder bed in the second dimension generates an exposed region wider than the laser spot on the powder bed.

22. A selective laser melting or selective laser sintering additive manufacturing apparatus according to claim 15, wherein an additional optical component is operable under the control of a third actuator to steer the laser beam over the powder bed in a second dimension, transverse to the first dimension, in order to scan an area to be solidified.

23. A selective laser melting or selective laser sintering additive manufacturing apparatus according to claim 22, wherein the controller is configured to control the third actuator to oscillate the laser beam across the powder bed in the second dimension in concert with the first actuator moving the laser beam across the powder bed in the first dimension.

24. A selective laser melting or selective laser sintering additive manufacturing apparatus according to claim 23, wherein the oscillation of the laser beam across the powder bed in the second dimension generates an exposed region wider than the laser spot on the powder bed.

25. A selective laser melting or selective laser sintering additive manufacturing apparatus according to claim 15, wherein the first actuator is a galvanometer and the second actuator is a piezoelectric, voice coil or normal stress actuator.

* * * * *